United States Patent [19]

Suzuki et al.

[11] Patent Number: 4,765,703
[45] Date of Patent: Aug. 23, 1988

[54] OPTICAL DEFLECTOR

[75] Inventors: Makoto Suzuki; Kazunari Taki, both of Nagoya, Japan

[73] Assignee: Brother Kogyo Kabushiki Kaisha, Aichi, Japan

[21] Appl. No.: 892,250

[22] Filed: Aug. 4, 1986

[30] Foreign Application Priority Data

Aug. 5, 1985 [JP] Japan .................. 60-171986

[51] Int. Cl.⁴ .......................................... G02F 1/315
[52] U.S. Cl. ................... 350/96.14; 350/96.11
[58] Field of Search ............... 350/96.14, 96.13, 96.15, 350/96.12, 96.11, 434

[56] References Cited

U.S. PATENT DOCUMENTS

| | | | |
|---|---|---|---|
| 3,795,433 | 3/1974 | Channin | 350/96.14 |
| 3,870,394 | 3/1975 | Ploeckl | 350/434 X |
| 4,070,092 | 1/1978 | Burns | 350/96.14 |
| 4,175,827 | 11/1979 | McMahon | 350/96.14 |
| 4,348,079 | 9/1982 | Johnson | 350/358 |
| 4,413,270 | 11/1983 | Sprague | 346/160 |
| 4,425,023 | 1/1984 | Matsumoto et al. | 350/96.14 |
| 4,470,661 | 9/1984 | Matsumoto | 350/96.13 |
| 4,478,483 | 10/1984 | Sprague | 350/96.14 |
| 4,548,464 | 10/1985 | Auracher et al. | 350/96.14 |
| 4,637,681 | 1/1987 | Yamamoto et al. | 350/96.12 |

FOREIGN PATENT DOCUMENTS

| | | |
|---|---|---|
| 21993 | 6/1980 | European Pat. Off. . |
| 21510 | 1/1981 | European Pat. Off. . |
| 48441 | 3/1982 | European Pat. Off. . |
| 2359797 | 6/1975 | Fed. Rep. of Germany . |
| 3102972 | 11/1981 | Fed. Rep. of Germany . |
| 3443863 | 6/1985 | Fed. Rep. of Germany . |
| 51-8949 | 1/1976 | Japan . |
| 54-150153 | 11/1979 | Japan . |
| 58-125025 | 7/1983 | Japan . |
| 58-147718 | 9/1983 | Japan . |
| 59-204027 | 11/1984 | Japan . |

OTHER PUBLICATIONS

Takizawa, "Electrooptical Fresnel Lens . . . ", Applied Optics, vol. 22, No. 16, 8/83, pp. 2468-2473.

"Electrooptic Fresnel Lens-Scanner with an Array of Channel Wave-Guides", K. Takizawa, Applied Optics, vol. 22, No. 16, Aug. 15, 1983.

"Matsunaga et al., "Optical Waveguide Isolator in Ti--Diffused LiNbO₃", Optics Communications, Dec. 1978, vol. 27, No. 3, pp. 361-364.

Tsao et al., "Photodeposition of Ti and Application to Direct Writing of Ti:LiNbO₃ Waveguides", Appl. Phys. Lett., vol. 42, No. 7, Apr. 83, pp. 559-561.

Primary Examiner—John Lee
Assistant Examiner—Michael Menz
Attorney, Agent, or Firm—Parkhurst & Oliff

[57] ABSTRACT

An optical deflector for deflecting a light beam within a predetermined range of angle, including a substrate having an electro-optical effect, a three-dimensional waveguide formed on one of opposite surfaces of the substrate, to guide waves of the light beam therethrough, and plural pairs of deflector electrodes. The waveguide includes a main path, and a plurality of branch paths diverging from the main path at respective branching portions of the waveguide. The branch paths are angled with respect to the main path so as to cover the predetermined range of angle. Each pair of deflector electrodes is disposed at a corresponding one of the branching portions of the three-dimensional waveguide, in order to produce an electric field locally at the corresponding branching portion of the waveguide, and thereby deflect the light beam from the main path into a corresponding one of the plurality of branch paths, due to the electro-optical effect upon selective application of a voltage between the deflector electrodes.

12 Claims, 3 Drawing Sheets

OPTICAL DEFLECTOR

BACKGROUND OF THE INVENTION

1. Field of the Invention

The present invention relates generally to an optical deflector device for deflecting a light beam, and more particularly to a technique for deflecting a light beam due to an electro-optical effect of an electro-optical material, without using mechanical moving parts.

2. Discussion of the Prior Art

An optical deflector for deflecting a light beam within a predetermined angular range is used in various devices such as a laser-beam printer and a bar code reader. Known as typical examples of such a light deflector are a polygon mirror and a hologram scanner. These deflectors use mechanical moving parts such as a rotary mechanism and a device for driving the rotary mechanism. Thus, these optical deflector devices tend to be complicated in construction, relatively large-sized, and are not satisfactory in durability.

SUMMARY OF THE INVENTION

It is accordingly an object of the present invention to provide an optical deflector which does not incorporate mechanical moving parts, and which is simple in construction, relatively small-sized and durable.

According to the present invention, there is provided an optical deflector for deflecting a light beam within a predetermined range of angle, including a substrate having an electro-optical effect, a three-dimensional waveguide formed on one of opposite surfaces of the substrate, to guide waves of the light beam therethrough, and a plurality of deflector electrode means. The waveguide includes a main path, and a plurality of branch paths diverging from the main path at respective branching portions of the waveguide. The branch paths are angled with respect to the main path so as to cover the predetermined range of angle. Each of the plurality of deflector electrode means is disposed at a corresponding one of the branching portions of the three-dimensional waveguide. Upon selective application of an electric voltage to each deflector electrode means, the deflector electrode means produces an electric field locally at the corresponding branching portion of the waveguide, and thereby deflect the light beam from the main path into a corresponding one of the plurality of branch paths, due to the electro-optical effect of the substrate.

In the optical deflector of the present invention constructed as described above, the refractive index of a part of the main path at each branching portion of the three-dimensional waveguide is increased when an electric field is locally produced at that branching portion due to an electro-optical effect of the substrate upon selective application of a voltage to the corresponding deflector electrode means. Therefore, the rays of the light beam which propagate through the above-indicated part of the main path are subject to a higher refractive index and are consequently deflected from the main path into the corresponding branch path, whereby the deflected light rays are passed through the branch path which diverges from the main path at a given angle.

In the above arrangement of the invention, the light beam propagating through the main path of the waveguide can be deflected into a selected one of the plurality of branch paths, by applying a suitable voltage to the appropriate deflector electrode means. Thus, the light beam may be deflected within the predetermined range of angle with respect to the main path.

According to one feature of the present invention, each deflector electrode means comprises a pair of generally elongate electrodes consisting of an inner electrode and an outer electrode. The inner electrode is disposed on the corresponding branching portion of the waveguide so as to extend parallel to the main path and the corresponding branch path. The outer electrode is spaced a predetermined distance from the inner electrode so as to be located outside the waveguide and extend substantially parallel to the inner electrode.

In accordance with another feature of the invention, each of the branch paths diverges from the main path at a branch point of the corresponding branching portion, symmetrically with a corresponding portion of the main path, with respect to a centerline which passes the branch point and which is parallel to a direction of propagation of the light beam through the waveguide. Each deflector electrode means comprises a pair of electrodes which are disposed on opposite sides of the centerline, symmetrically with each other with respect to the centerline, so as to extend between two points upstream and downstream of the branch point, such that a distance between the pair of electrodes decreases in a downstream direction of the waveguide.

According to a further feature of the invention, each of the branch paths diverges from the main path symmetrically with the corresponding portion of the main path, with respect to the centerline, as described above. In this case, however, each deflector electrode means comprises a central electrode having a generally triangular shape, and a pair of side electrodes. The central electrode is disposed in alignment with the centerline such that an apex of the central electrode is positioned in the vicinity of the branch point, whereby a width of the central electrode increases in a downstream direction of the waveguide. The side electrodes are disposed on opposite sides of the centerline symmetrically with each other with respect to the centerline, so as to sandwich the corresponding branching portion of the waveguide such that a portion of each side electrode on the downstream side of the branch point is spaced from the central electrode, in the direction perpendicular to said direction of propagation of the light beam.

According to a still further feature of the invention, the three-dimensional waveguide has a refractive index which increases in a direction toward a centerline thereof, in a plane perpendicular to a direction of propagation of the light beam through the waveguide, so that the waves of the light beam are trapped in directions of thickness and width of the substrate in the plane.

According to a yet further feature of the invention, the substrate consists of a single crystal of $LiNbO_3$.

According to another aspect of the present invention, there is provided an optical deflector for deflecting a light beam within a predetermined range of angle, including a substrate having an electro-optical effect, a semi-conductor laser element fixed at one of opposite ends of the substrate, a condenser portion formed on one of opposite surfaces of the substrate, and a deflector portion. The semi-conductor element is adapted to emit a laser radiation from the above-indicated one end of the substrate so that the radiation propagates along a plane of the substrate. The condenser portion is disposed adjacent to the semi-conductor laser element, to condense the laser radiation into parallel rays of laser light. The deflector portion includes a three-dimensional waveguide formed on the above-indicated one of opposite surfaces of the substrate, and a plurality of deflector electrode means. The waveguide is formed to guide therethrough the parallel rays of laser light from the condenser. The waveguide includes a main path, and a plurality of branch paths diverging from the main path at respective branching portions of the waveguide. The branch paths are angled with respect to the main path so as to cover the predetermined range of angle. Each of the plurality of deflector electrode means is disposed at a corresponding one of the branching portions of the three-dimensional waveguide. Each deflector electrode means is adapted to produce an electric field locally at the corresponding branching portion of the waveguide, and thereby deflect the light beam from the main path into a corresponding one of the plurality of branch paths, due to the electro-optical effect of the substrate upon selective application of a voltage to each deflector electrode means.

According to one feature of the above aspect of the present invention, the condenser portion is formed by diffusion of a metal through a part of the substrate from the above-indicated one of opposite surfaces of the substrate, so as to give the condenser portion a refractive index which increases toward its center in opposite directions perpendicular to a direction of propagation of the parallel rays of laser light.

In accordance with another feature of the same aspect of the invention, the optical deflector further comprises a toroidal lens for converging the laser light emitted selectively from the ends of the main path and the branch paths of the waveguide which are located at the other of the opposite ends of the substrate remote from the semi-conductor laser element.

BRIEF DESCRIPTION OF THE DRAWINGS

The foregoing and optional objects, features and advantages of the present invention will be better understood by reading the following description of preferred embodiments of the invention, when considered in connection with the accompanying drawings, in which.

DESCRIPTION OF THE PREFERRED EMBODIMENT

The preferred embodiments of the invention will now be described in detail, by reference to the accompanying drawings.

Figure 1:
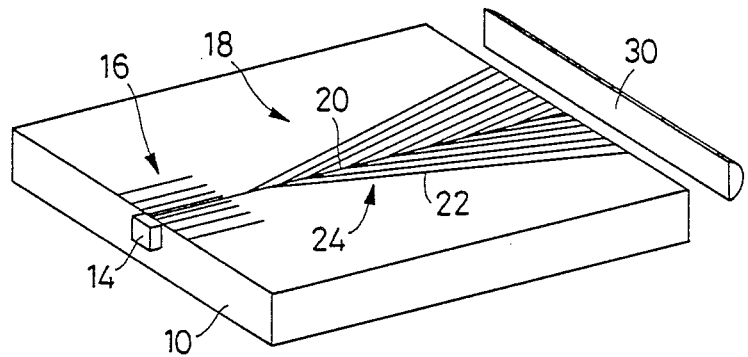
FIG. 1 is a perspective view of an arrangement of an optical defletor according to one embodiment of the present invention.

Referring to FIG. 1, there is shown a rectangular substrate 10 in the form of a translucent plate which is made of an electro-optical material having an electro-optical effect. For example, the substrate 10 is formed of a single crystal of $LiNbO_3$. On one of the opposite major surfaces of the rectangular substrate 10, there are formed a condenser portion 16 disposed adjacent to one of the opposite longitudinal ends of the substrate 10, and a deflector portion 18 disposed between the condenser portion 16 and the other longitudinal end of the substrate 10.

On the end face of the substrate 10 at the above-indicated one longitudinal end, there is fixed a semi-conductor laser element in the form of a chip 14 which emits a laser radiation so that the radiation is incident upon the condenser portion 16. The condenser portion 16 is adapted to function as a convex lens for condensing the incident radiation from the laser chip 14 into parallel rays of laser light. This condenser portion 16 is formed by diffusion of a suitable metal such as Ti through a part of the substrate 10 from the upper major surface, such that the condenser portion 16 has a refractive index which increases toward its center in opposite directions along the width of the substrate 10, i.e., in opposite directions perpendicular to the direction of propagation of the parallel rays of laser light emitted from the condenser portion 16. While the condenser portion 16 cannot be visually distinguished from the substrate 10, its continuously varying refractive index is indicated by parallel straight lines in FIG. 1. The density of the straight lines indicates the refractive index. The condenser portion 16 may be replaced by a geodesic lens provided in the form of a part-spherical concave cavity formed in the upper major surface of the substrate 10.

Figure 2:
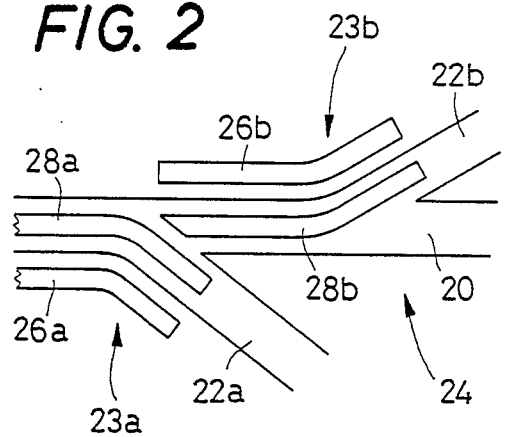
FIG. 2 is a fragmentary enlarged view showing in detail branching portions of a three-dimensional waveguide of the optical deflector of FIG. 1.

The deflector portion 18 has a three-dimensional waveguide generally indicated at 24. The waveguide 24 consists of a straight main path 20 which receives the parallel rays of laser light from the condenser portion 16, and a plurality of straight branch paths 22 which diverge from the main path 20 alternately on opposite sides of the main path 20. More specifically, the branch paths 22 branch from respective branching portions 23 (23a, 23b, etc.) of the waveguide 24, which are spaced apart from each other along the main path 18, as indicated in FIG. 2. The ends of the branch paths 22a, 22b, etc. remote from the branching portions 23a, 23b, etc. are located at the end of the substrate 10 remote from the laser chip 14. The angles of the branch paths 22 with respect to the main path 20, and the locations of the branching portions 23 in the direction of the length of the main path 20 are determined so that the ends of the branch paths 22 cover a predetermined angular range of deflection of the laser beam. The angle of each branch path 22 to the main path 20 corresponds to an angle of deflection of the laser beam at the corresponding branching portion 23. The main and branch paths 20, 22 of the three-dimensional waveguide 24 have a refractive index which increases in a direction toward its centerline, in a plane perpendicular to the direction of propagation of the laser beam through the paths 20, 22, so that the waves of the laser light are trapped in the directions of thickness and width of the substrate 10. While the three-dimensional waveguide 24 having a higher refractive index cannot be visually distinguished from the substrate 10, the main and branch paths 20, 22 are indicated in solid lines in FIGS. 1 and 2, for easy understanding.

A pair of generally elongate parallel deflector electrodes 26, 28 are disposed at each branching portion 23, for deflecting the parallel rays of laser into the corresponding branch path 22. Each pair of deflector electrodes 26, 28 consist of an outer electrode 26, and an inner electrode 28 having a smaller width than that of the main and branch paths 20, 22. As depicted in detail in FIG. 2, the outer electrode 26a at the branching portion 23a, for example, is disposed outside the waveguide 24, so as to extend along the outer edges of the main path 20 and the corresponding branch path 22a, with a suitable distance from the outer edges. The corresponding inner electrode 28a at the branching portion 23a is disposed on the centerlines of the main path 20 and the branch path 22a, so as to extend parallel to the outer electrode 26a. That is, the outer and inner electrodes 26a and 28a are spaced apart from each other in a direction perpendicular to the center lines of the main and branch paths 20, 22a, so that an area between the outer and inner electrodes 26a, 28a overlaps parts of the main and branch paths 20, 22a along their corresponding outer edges. The outer and inner electrodes 26b, 28b at the branching portion 23b adjacent to the branching portion 23a, are disposed in the same manner.

The optical deflector constructed as described above may be used for a laser-beam printer or an optical image reader, for example. A torodial lens 30 is disposed between the end of the substrate 10 remote from the laser chip 14, and a photosensitive drum surface of the laser-beam printer or a medium surface to be read by the image reader, so that the drum surface or medium surface is scanned by the laser beam which is swept by the instant optical deflector. The laser beam emitted from the end of each branch path 22 of the waveguide 24 is converged by the toroidal lens 30, and thus focused or concentrated at a point on the photosensitive drum surface or medium surface.

There will be described the operation of the present optical deflector for deflecting or sweeping a laser beam over a predetermined angular range.

As previously described, the parallel rays of laser light from the condenser portion 16 are introduced into the main path 20 of the three-dimensional waveguide 24. If none of the electrode pairs 26, 28 at the branching portions 23 are energized, the rays are passed through the straight main path 20, without deflection into any branch paths 22. As a result, the laser rays are emitted from the end of the main path 20 at the end of the substrate 10 remote from the semi-conductor laser chip 14. If an electric voltage of a suitable level is applied between the outer and inner electrodes 26a, 28a at the branching portion 23a, for example, the outer part of the main path 20 located between the outer and inner electrodes 26a, 28a is given a higher refractive index than the other parts of the main path 20, due to an electro-optical effect.

Generally, an electro-optical material has a refractive index which is varied with a magnitude of an electric field in which the material is placed. In the case where the substrate 10 is formed of a Z-cut crystal, a variation $\Delta n$ in refractive index of a portion of the substrate 10 between the energized outer and inner electrodes 26, 28 is expressed by the following equation (1):

$$\Delta n = (\tfrac{1}{2}) n_e^3 \cdot r_{33} \cdot E \tag{1}$$

where, $n_e$: refractive index of the substrate 10 with respect to abnormal light $r_{33}$: electro-optical constant of the substrate 10 in the direction of thickness E: magnitude of electric field.

The above equation (1) indicates that the refractive index of the portion of the substrate 10 between the two electrodes 26 and 28, i.e., refractive index of the part of the main path 20 of the waveguide 24 between the two electrodes 26a and 28a is increased as compared with the index of the other parts of the main path 20, when an electric voltage is applied between the two electrodes 26a, 28a.

Therefore, the laser rays which propagate in the above-indicated part of the main path 20 experience a comparatively higher refractive index, whereby the laser beam as a whole is deflected on the side of the outer electrode 26a, and thereby directed into the corresponding branch path 22a. The laser beam thus introduced into the branch path 22a is guided through this branch path 22a, and emitted from its end toward the toroidal lens 30. In this manner, the laser beam is deflected by an angle corresponding to the angle of the branch path 22a with respect to the main path 20.

Thus, the laser beam may be deflected at a desired angle, by selecting one of the branching portions 23, namely, by applying an electric voltage between the outer and inner electrodes 26 and 28 at the selected branching portion 23. In this connection, it is noted that the spacings between the adjacent branching portions 23 along the main path 20, and the angles of the branch paths 22 relative to the main path 20 are determined so that the laser beam emitted from the branch paths 22 may cover a desired sweep range of the optical deflector, as previously indicated.

As discussed above, the deflector portion 18 of the illustrated optical deflector is adapted to deflect a laser beam by changing the refractive index of the main path 20 of the three-dimensional waveguide 24, locally at the selected branching portion 23, through the utilization of an electro-optical effect of the material which constitutes the waveguide 24. This local change in the refractive index is achieved by applying an electric voltage to one of the plurality of electrode pairs 26, 28 at the selected branching portion 23. Hence, the instant optical deflector has eliminated any mechanical moving parts as used in a rotary mechanism and a rotary driving device employed in the conventional optical deflector. The elimination of such mechanical parts assures improved operating reliability and durability of the optical deflector, and noise-free operation of the deflector. These are some of the advantages offered by the present optical deflector.

Figure 3:
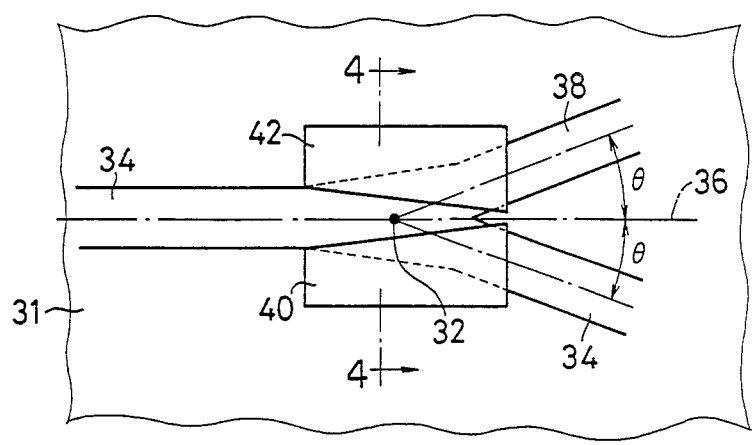
FIG. 3 is a view corresponding to FIG. 2, showing another embodiment of an optical deflector of the invention.

Another embodiment of the invention will be described referring to FIG. 3 and FIGS. 4(a) and 4(b). More specifically, FIG. 3 shows one of a plurality of branching portions of a three-dimensional waveguide of the deflector portion provided on a substrate 31, which is formed of a Z-cut crystal of the same material as the substrate 10 of the preceding embodiment. In the present modified embodiment, a main path 34 of the waveguide is bent at each branching portion, on one side of a centerline 36, by a predetermined angle $\theta$ with respect to the centerline 36. The centerline 36 passes a branch point 32 of the branching portion and is parallel to the direction of propagation of the laser beam through the waveguide. A branch path 38 diverges from the main path 34 at the branch point 32, on the other side of the centerline 36, such that an angle formed by the branch path 38 and the centerline 36 is equal to the angle $\theta$.

Namely, the branch path 38, and the corresponding bent portion of the main path 34 downstream of the branch point 32 are formed symmetrically with each other with respect to the centerline 36. In each branching portion of the waveguide as described above, a pair of spaced-apart deflector electrodes 40, 42 are formed on the substrate 31 via respective buffer layers 44, such that the electrodes 40, 42 are partly disposed over the main path 34, as indicated in FIG. 4(a). These deflector electrodes 40, 42 are positioned, dimensioned and shaped so that each electrode 40, 42 extends between two points upstream and downstream of the branch point 32 over a predetermined length, generally in the direction parallel to the centerline 36, and such that the distance between the opposite inner edges of the two electrodes 40, 42 decreases as the electrodes extend in the downstream direction of the waveguide 34, 38.

Figure 4:
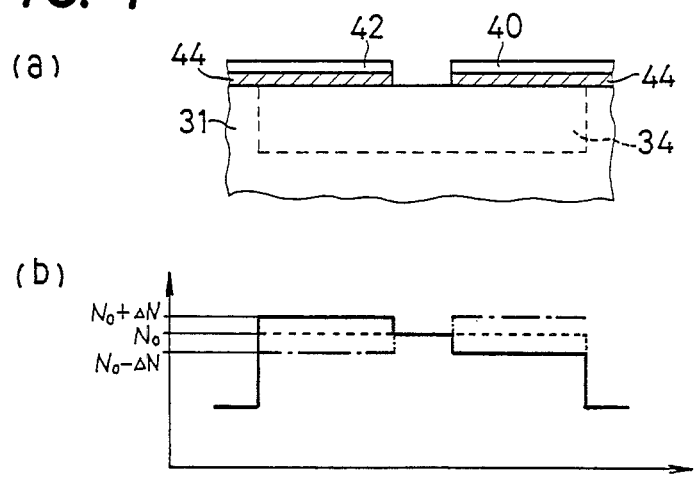
FIG. 4(a) is an enlarged view in cross section taken along line 4—4 of FIG. 3.
FIG. 4(b) is a view showing a distribution of a refractive index of a branching portion of the optical deflector, as seen in the cross section of FIG. 4(a)

In the present embodiment, the electrode 40 is grounded while the electrode 42 is subject to a positive voltage, for example, so that there is established a distribution of a refractive index, as indicated in Fig. 4(b), in the direction of width of the main path 34 of the waveguide in the branching portion, e.g., in the cross section of FIG. 4(a) including the branch point 32. Described more particularly, the Z-cut crystal substrate 31 has a property that its refractive index is varied sensitively as a function of the magnitude of an electric field in the Z-axis direction, i.e., in the direction of thickness of the substrate 31. Since the magnitude of the electric field in the direction of thickness upon application of a voltage to the electrode 42 is different locally in the direction of width of the main path 34, the refractive index of the main path 34 in the width direction is accordingly different. More specifically, assuming the main path 34 has a refractive index $N_o$, the refractive indexes of the portions of the main path 34 corresponding to the electrodes 40 and 42 upon application of a voltage to the electrode 42 are $N_o - \Delta N$, and $N_o + \Delta N$, respectively, as indicated in solid lines in FIG. 4(b). A dashed line in FIG. 4(b) represents the refractive index while no voltage is applied to the electrode 42. In the arrangement described above, the rays of laser light passing through the right and left portions of the main path 34 (as viewed in the direction of propagation of the laser light) experience the different refractive indexes ($N_o - \Delta N$, and $N_o + \Delta N$), in the branching portion (in the vicinity of the branch point 32), whereby the laser beam passing through the main path 34 is deflected into the branch path 38, as in the preceding embodiment.

On the other hand, when the electrode 42 is grounded while the electrode 40 is subject to a positive voltage, the branching portion in question has the distribution of refractive index as indicated in one-dot chain line in FIG. 4(b), which distribution is reversed with respect to that established when a positive voltage is applied to the electrode 42, as described above. As a result, the laser beam is deflected into the bent portion of the main path 34.

Figure 5:
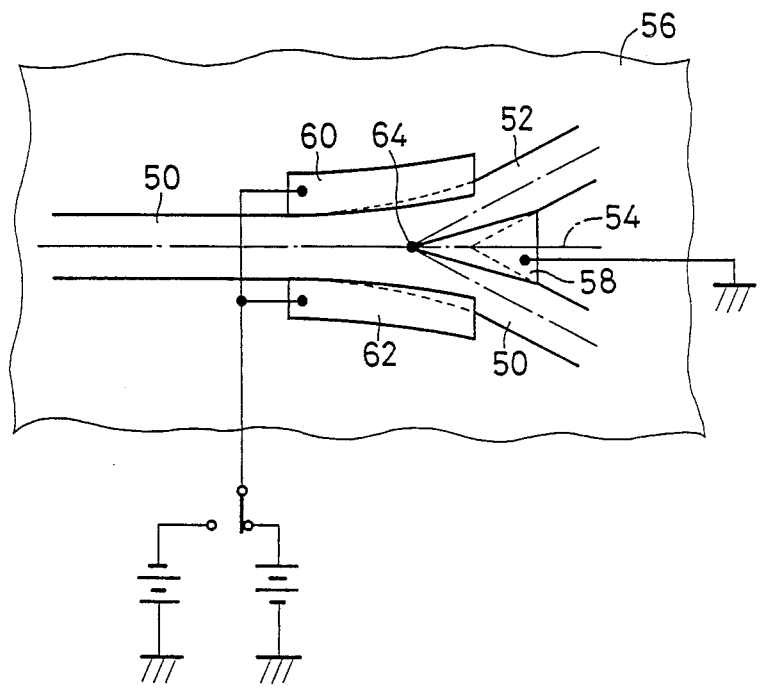
FIG. 5 is a view also corresponding to FIG. 2, showing a further modified embodiment of the invention.

A further modified embodiment of the invention is illustrated in FIG. 5, wherein a branch path 52 diverges from a main path 50 at a branch point 64, at a predetermined angle with respect to a centerline 54, such that the branch path 52 is symmetrical with a bent portion of the main path 50 with respect to the centerline 54, in the same manner as in the preceding embodiment of FIG. 3. The centerline 54 passes the branch point 64 and is parallel to the direction of propagation of the laser beam through the waveguide. In the present embodiment, a substrate 56 is formed of a Y-cut crystal which has a property that its refractive index is varied sensitively as a function of the magnitude of an electric field in the Y-axis direction (in the direction perpendicular to the direction of propagation of the laser beam through the waveguide). On this substrate 56, there are formed a central electrode 58 and a pair of side electrodes 60, 62, as shown in FIG. 5. The central electrode 58 has a generally triangular shape, and is disposed in alignment with the centerline 54, such that its apex is located at the branch point 64 on the centerline 54. That is, the width of the central electrode 58 increases in the direction of propagation of the laser beam. The side electrodes 60, 62 are positioned on opposite sides of the centerline 54 so as to sandwich the branching portion of the waveguide (in the vinicity of the branch point 64), such that the portions of the electrodes 60, 62 downstream of the branch point 64 are spaced from the central electrode 58 in the direction of width of the waveguide.

In the present modified embodiment, a positive voltage is applied across the side electrodes 60 while the central electrode 58 is held grounded. As a result, electric fields are produced between the side electrode 60 and the central electrode 58, and between the side electrode 62 and the central electrode 58. Since these electric fields are formed in the opposite Y-axis directions, the refractive index of the branching portion of the waveguide is changed in the Y-axis direction (perpendicular to the direction of propagation of the laser beam), whereby the refractive index of the branching portion has a distribution similar to that shown in FIG. 4(b). Thus, the laser beam passing through the main path 50 is deflected at the branch point 64 and directed into the branch path 52.

On the other hand, when a negative voltage is applied across the side electrodes 60, 62, the distribution of refractive index of the branching protion in question is reversed, whereby the laser beam is deflected into the bent portion of the main path 50.

While the present invention has been described in its preferred embodiments by refereence to the figures of the drawings, it is to be understood that the invention may be otherwise embodied.

For example, the substrate 10, 31, 56 may consists of a base made of $LiTaO_3$ having a relatively low electro-optical effect, or $SiO_2$ having no electro-optical effect, and a comparatively thin layer formed on the base and made of a material which has a relatively high electro-optical effect.

Further, the configuration of the outer and inner electrodes 26, 28 provided as deflector electrode means of the first embodiment of FIGS. 1–2 may be modified as necessary, provided that an area located between the outer and inner electrodes contains an outer part of the main path on the side of the corresponding branch path, at each branching portion of the waveguide. Preferably, the two electrodes are configured and positioned such that an area between the two electrodes also contains an outer part of the branch path on the same side of the above-indicated part of the main path.

While the illustrated embodiments use a semi-conductor laser element in the form of the laser chip 14 attached at one end face of the substrate, the laser chip 14 may be replaced by a combination of a laser source, and an optical fiber which is connected at its one end to the laser source and at the other end to the incoming end of the condenser portion 16.

Although the toroidal lens 30 is used in the illustrated embodiments, the lens 30 may be eliminated, where the size of a spot of the laser beam to be formed on the subject surface need not be so small. Further, other suitable optical elements may be substituted for the toroidal lens 30.

It is further understood that the form of the invention herein described and shown is to be taken as a preferred example of the same, and that various changes and modifications may be restorted to without departing from the spirit and scope of the invention.

What is claimed is:

1. An optical deflector for deflecting a light beam for scanning a surface of a medium over a predetermined angular range, comprising:
    a substrate having an electro-optical effect;
    a three-dimensional waveguide formed on one of opposite surfaces of said substrate, to guide waves of said light beam therethrough, said waveguide including a main path, and a plurality of branch paths diverging from said main path at respective branching portions of said waveguide, said branching portions being spaced apart from each other in a direction parallel to said main path, said branch paths being angled with respect to said main path so as to cover said predetermined angular range, and the number of said branch paths being sufficient to scan the surface of said medium over said predetermined angular range;
    a plurality of deflector electrode means each disposed at a corresponding one of said branching portions of said three-dimensional waveguide, said each deflector electrode means producing an electric field locally at said corresponding branching portion of said waveguide, and thereby deflecting said light beam from said main path into a corresponding one of said plurality of branch paths, due to said electro-optical effect upon selective application of a voltage to said each deflector electrode means; and
    a toroidal lens disposed between an end of said corresponding branch path remote from said corresponding branching portion, and said surface of the medium, for converging the deflected light beam emitted selectively from said end of said corresponding branch path, so as to provide a beam spot at a point on said surface of the medium corresponding to said corresponding branch path.

2. An optical deflector according to claim 1, wherein said main path is straight, and said plurality of branch paths diverge from said straight main path alternately on opposite sides of said main path, said each deflector electrode means comprising a pair of electrodes consisting of an inner electrode disposed on said corresponding branching portion of said waveguide so as to extend parallel to said straight main path and said corresponding branch path, and an outer electrode spaced a predetermined distance from said inner electrode so as to be located outside said waveguide and extend substantially parallel to said inner electrode.

3. An optical deflector according to claim 1, wherein each of said branch paths diverges from said main path at a branch point of the corresponding branching portion, symmetrically with a corresponding portion of said main path, with respect to a centerline which passes said branch point and which is parallel to a direction of propagation of said light beam through said waveguide, said each deflector electrode means consisting of a pair of electrodes disposed on opposite sides of said centerline, symmetrically with each other with respect to said centerline, so as to extend between two points upstream and downstream of said branch point, such that a distance between said pair of electrodes decreases in a downstream direction of the waveguide.

4. An optical deflector according to claim 1, wherein each of said branch paths diverges from said main path at a branch point of the corresponding branching portion, symmetrically with a corresponding portion of said main path, with respect to a centerline which passes said branch point and which is parallel to a direction of propagation of said light beam through said waveguide, said each deflector electrode means comprising a central electrode having a generally triangular shape, and a pair of side electrodes, said central electrode being disposed in alignment with said centerline such that an apex of said central electrode is positioned in the vicinity of said branch point, whereby a width of said central electrode increases in a downstream direction of said waveguide, said pair of side electrodes being disposed on opposite sides of said centerline symmetrically with each other with respect to said centerline, so as to sandwich the corresponding branching portion such that a portion of each of said side electrodes on the downstream side of said branch point is spaced from said central electrode.

5. An optical deflector according to claim 1, wherein said three-dimensional waveguide having a refractive index which increases in a direction toward a centerline thereof, in a plane perpendicular to a direction of propagation of said light beam through said waveguide, so that the waves of said light beam are trapped in directions of thickness and width of said substrate in said plane.

6. An optical deflector according to claim 1, wherein said substrate consists of a single crystal of $LiNbO_3$.

7. An optical deflector for deflecting a light beam for scanning a surface of a medium over a predetermined angular range, comprising:
    a substrate having an electro-optical effect;
    a semi-conductor laser element fixed at one of opposite ends of said substrate to emit a laser radiation from said one end so that said radiation propagates along a plane of said substrate;
    a condensor portion formed on one of opposite surfaces of said substrate and disposed adjacent to said semi-conductor laser element, to condense said laser radiation into parallel rays of laser light as said light beam;
    a deflector portion including a three-dimensional waveguide formed on said one of opposite surfaces of said substrate, and a plurality of deflector electrode means, said waveguide guiding therethrough said parallel rays of laser light from said condensor, said waveguide including a main path, and at least three branch paths diverging from said main path at respective branching portions of said waveguide, said branching portions being spaced apart from each other in a direction parallel to said main path, said branch paths being angled with respect to said main path so as to cover said predetermined angular range, and the number of said branch paths being sufficient to scan the surface of said medium over said predetermined angular range, each of said plurality of deflector electrode means being disposed at a corresponding one of said branching portions of said three-dimensional waveguide, said each deflector electrode means producing an electric field locally at said corresponding branching portion of said waveguide, and thereby deflecting said light beam from said main path into said corresponding branch path, due to said electro-optical effect upon selective application of a voltage to said each deflector electrode means; and converging means disposed between the other end of said substrate and said surface of the medium, for converging the deflected light beam emitted selectively from said corresponding branch path, so as to provide a beam spot at a point on said surface of the medium corresponding to said corresponding branch path.

8. An optical deflector according to claim 7, wherein said condenser portion is formed by diffusion of a metal through a part of said substrate from said one of opposite surfaces, so as to give said condenser portion a refractive index which increases toward a center thereof in opposite directions perpendicular to a direction of propagation of said parallel rays of laser light.

9. An optical deflector for deflecting a light beam for scanning a surface of a medium over a predetermined angular range, comprising:

a substrate having an electro-optical effect;

a three-dimensional waveguide formed on one of opposite surfaces of said substrate, to guide waves of said light beam therethrough, said waveguide including a straight main path, and at least three branch paths diverging from said main path at respective branching portions of said waveguide, said branching portions being spaced apart from each other in a direction parallel to said main path, said branch paths being angled with respect to said main path so as to cover said predetermined angular range, and the number of said branch paths being sufficient to scan the surface of said medium over said predetermined angular range; and a plurality of deflector electrode means each disposed at a corresponding one of said branching portions of said three-dimensional waveguide, said each deflector electrode means producing an electric field locally at said corresponding branching portion of said waveguide, and thereby deflecting said light beam from said main path into said corresponding branch path, due to said electrooptical effect upon selective application of a voltage to said each deflector electrode means.

10. An optical deflector for deflecting a light beam for scanning a surface of a medium over a predetermined angular range, comprising:

a substrate having an electro-optical effect;

a semi-conductor laser element fixed at one of opposite ends of said substrate to emit a laser radiation from said one end so that said radiation propagates along a plane of said substrate;

a condensor portion formed on one of opposite surfaces of said substrate and disposed adjacent to said semi-conductor laser element, to condense said laser radiation into parallel rays of laser light as said light beam;

a deflector portion including a three-dimensional waveguide formed on said one of opposite surfaces of said substrate, and a plurality of deflector electrode means, said waveguide guiding therethrough said parallel rays of laser light from said condensor, said waveguide including a main path, and a plurality of branch paths diverging from said main path at respective branching portions of said waveguide, said branching portions being spaced apart from each other in a direction parallel to said main path, said branch paths being angled with respect to said main path so as to cover said predetermined angular range, and the number of said branch paths being sufficient to scan the surface of said medium over said predetermined angular range, each of said plurality of deflector electrode means being disposed at a corresponding one of said branching portions of said three-dimensional waveguide, said each deflector electrode means producing an electric field locally at said corresponding branching portion of said waveguide, and thereby deflecting said light beam from said main path into a corresponding one of said plurality of branch paths, due to said electro-optical effect upon selective application of a voltage to said each deflector electrode means; and a toroidal lens disposed between the other end of said substrate and said surface of the medium, for converging the deflected light beam emitted selectively from said corresponding branch path, so as to provide a beam spot at a point on said surface of the medium corresponding to said corresponding branch path.

11. An optical deflector according to claim 9, wherein said plurality of branch paths diverge from said straight main path alternately on opposite sides of said main path.

12. A method of scanning a surface of a medium over a predetermined angular range; comprising the steps of:

preparing a substrate having an electro-optical effect;

generating a light beam such that said light beam propagates along a plane of said substrate;

forming a three-dimensional waveguide on one of opposite surfaces of said substrate, to guide waves of said light beam therethrough, said waveguide including a main path, and a plurality of branch paths diverging from said main path at respective branching portions of said waveguide, such that said branching portions are spaced apart from each other in a direction parallel to said main path, and such that said branch paths are angled with respect to said main path so as to cover said predetermined angular range;

determining the number of said branch paths so as to be sufficient to scan the surface of said medium over said predetermined angular range;

forming a plurality of deflector electrode means such that each deflector electrode means is disposed at a corresponding one of said branching portions of said three-dimensional waveguide; and applying a voltage selectively to said each deflector electrode means, so as to produce an electric field locally at said corresponding branching portion of said waveguide, for thereby deflecting said light beam from said main path into a corresponding one of said plurality of branch paths, due to said electro-optical effect, so that said predetermined angular range of said surface of the medium is scanned by spots of the deflected light beam which correspond to said branch paths.

* * * * *